(12) United States Patent
Kovacevitch et al.

(10) Patent No.: US 10,453,265 B1
(45) Date of Patent: Oct. 22, 2019

(54) METHOD AND DEVICE FOR THE VIRTUAL TRY-ON OF GARMENTS BASED ON AUGMENTED REALITY WITH MULTI-DETECTION

(71) Applicant: Michel Kovacevitch, Dubai (AE)

(72) Inventors: Michel Kovacevitch, Dubai (AE); Mohamed Alaya Jlayliya, Ariana, TN (US)

(73) Assignee: PAGE INTERNATIONAL—FZ—LLC, Dubai (AE)

( * ) Notice: Subject to any disclaimer, the term of this patent is extended or adjusted under 35 U.S.C. 154(b) by 0 days.

(21) Appl. No.: 15/946,073

(22) Filed: Apr. 5, 2018

(51) Int. Cl.
*G06T 19/00* (2011.01)
*G06K 9/00* (2006.01)

(52) U.S. Cl.
CPC ........ *G06T 19/006* (2013.01); *G06K 9/00362* (2013.01)

(58) Field of Classification Search
None
See application file for complete search history.

(56) References Cited

U.S. PATENT DOCUMENTS

| | | | |
|---|---|---|---|
| 2012/0086783 A1* | 4/2012 | Sareen | G06N 3/006 348/47 |
| 2013/0304587 A1* | 11/2013 | Ralston | G06Q 30/0271 705/14.67 |
| 2014/0035913 A1* | 2/2014 | Higgins | G06T 17/00 345/420 |
| 2014/0279192 A1* | 9/2014 | Selby | G06Q 30/0631 705/26.7 |
| 2017/0018024 A1 | 1/2017 | Xu et al. | |

* cited by examiner

*Primary Examiner* — Yanna Wu

(57) ABSTRACT

Method for the virtual try-on of garments (9) based on augmented reality with the aid of an electronic communication device (1) equipped with at least one screen (2) and one image acquisition organ (3), comprising at least the following steps:
a) detecting with the aid of the image acquisition organ (3) at least the face and shoulders of at least one person (5, 6) positioned in front of the electronic communication device (1),
b) defining digital data representative of the shape and dimensions of the face and shoulders of the person (5, 6) detected at step a),
c) defining digital data representative of the position of the face and shoulders of the person (5, 6) on the screen (2) based on the data defined at step b),
d) superimposing, on the screen (2) the image of a garment (9) from a database onto the image of the person (5, 6) by using the data defined in steps b) and c),
e) maintaining, on the screen (2), the superimposition of the image of the garment (9) on the image of the person (5, 6) during the movement of the latter, characterized in that: steps a) to e) are repeated for as many times as there are persons (5, 6) positioned in front of the image acquisition organ (3) and in that, before step d), at least one additional step f) is performed, involving superimposing an image of the graphical motif (7) from a database (8) onto the image of the garment (9).

17 Claims, 5 Drawing Sheets

METHOD AND DEVICE FOR THE VIRTUAL TRY-ON OF GARMENTS BASED ON AUGMENTED REALITY WITH MULTI-DETECTION

BACKGROUND OF THE INVENTION

The present invention relates to a method and device for the virtual try-on of garments based on augmented reality with multi-detection.

For several years, the use of augmented reality has been known for the virtual try-on of garments, be they shirts, T-shirts, trousers or accessories such as glasses, hats or caps. In this case, the user, with a usually dedicated computer device or a PC type computer connected to a camera can virtually superimpose a garment on his image and display the result on a screen. Usually, these devices are relatively heavy, in terms of materials, and do not allow the user to be displayed in different positions and/or in motion.

Recently, technical improvements have emerged aimed at making the devices used more lightweight. Thus, US-A-2017/0018024 discloses a virtual try-on method by augmented reality using a wireless mobile device, such as a smartphone or tablet. This method detects the face, then the shoulders and neck of the person in order to model the shape of the person's upper body and to superimpose on this static shape a garment such as a shirt or T-shirt.

The method allows the person's movements to be followed, by tracking, and thus adapt the movement of the garment to that of the person. In all cases, the garments superimposed on the image of the person are drawn from a defined database, with a given number of garments. In fact, the user chooses a garment from a more or less large collection of garments, offered by the provider of the device. The user does not, therefore, have the possibility of personalizing the chosen garment.

These are the drawbacks that this invention intends more particularly to overcome by proposing a method and a device that offer the possibility of personalization of the garments that are to be virtually and simultaneously tried on by several users with diverse morphologies while being easy to implement.

BRIEF SUMMARY OF THE INVENTION

To this end, the subject matter of the invention relates to a method for the virtual try-on of garments based on augmented reality with the aid of an electronic communication device equipped with at least one screen and one image acquisition organ, comprising at least the following steps:
  a) detecting with the aid of the image acquisition organ at least the face and shoulders of at least one person positioned in front of the electronic communication device,
  b) defining digital data representative of the shape and dimensions of the face and shoulders of the person detected at step a),
  c) defining digital data representative of the position of the face and shoulders of the person on the screen of the electronic communication device based on the data defined at step b),
  d) superimposing, on the screen of the electronic communication device, by the known technique of data mapping, the image of a garment from a database onto the image of the person by using the data defined in steps b) and c),
  e) maintaining, on the screen of the electronic communication device, the superimposition of the image of the garment on the image of the person during the movement of the latter in the field of detection of the image acquisition organ of the electronic communication device, characterized in that:
    steps a) to e) are repeated for as many times as there are persons positioned in front of the image acquisition organ of the electronic communication device and in that, before step d), at least one additional step f) is performed, involving superimposing an image of the graphical motif from a database onto the image of the garment.

It is thus possible to use the invention for one or more persons, provided that the latter are positioned in front of the video-image acquisition organ of the electronic communication device, it being understood that the acquisition organ is adapted to acquire fixed or moving images, for example a photo camera or video camera. This multi-detection of persons allows, whether these persons are adults and/or children, to virtually superimpose a garment on the image of each person whether that person is alone or in a group. The invention allows, by regularly repeating the steps of the method, to manage not only the movement of persons in the field of view of the image acquisition organ but also the number of persons visible at a given moment in the field of view of the image acquisition organ, whatever the relative position of each person in relation to the others.

Moreover, the garment to be tried on can be personalized by superimposing a given graphical motif, from the database, during step f). Thus a wide range of possibilities of personalization during the use of the invention is made available.

According to advantageous but not compulsory aspects of the invention, such a method can comprise one or more of the following steps:
  The electronic communication device is chosen, for example, from smartphones, tablets, laptop or desktop computers, multimedia touchscreens and robots equipped with a screen.
  The image acquisition organ is chosen from fixed image acquisition organs or from moving image acquisition organs.
  During step f), the graphical motif is chosen from drawings, paintings or photos stored in a database.
  During step f), the database is remote from the electronic communication device and cloud hosted.
  During step f), the database is hosted by the electronic communication device.
  During step f), the graphical motif stored in a database is provided by the user of the method.
  During step f), the graphical motif stored in a database is provided by a third party having only limited access to the database.
  During step f), additional information on the third party providing the graphical motif is associated with the graphical motif.
  The additional information is, for example, the geolocation of the third party, an internet link to a dedicated site.

The invention also concerns a garment virtual try-on device using the method according to one of the preceding steps, comprising at least one electronic communication device, a database of graphical motifs and a database of images of garments.

BRIEF DESCRIPTION OF THE SEVERAL VIEWS OF THE DRAWINGS

A better understanding of the invention and further advantages thereof will emerge more clearly from the following description of several embodiments of the invention, given by way of non-limiting examples and made with reference to the following drawings, in which.

DETAILED DESCRIPTION OF THE INVENTION

Figure 1:
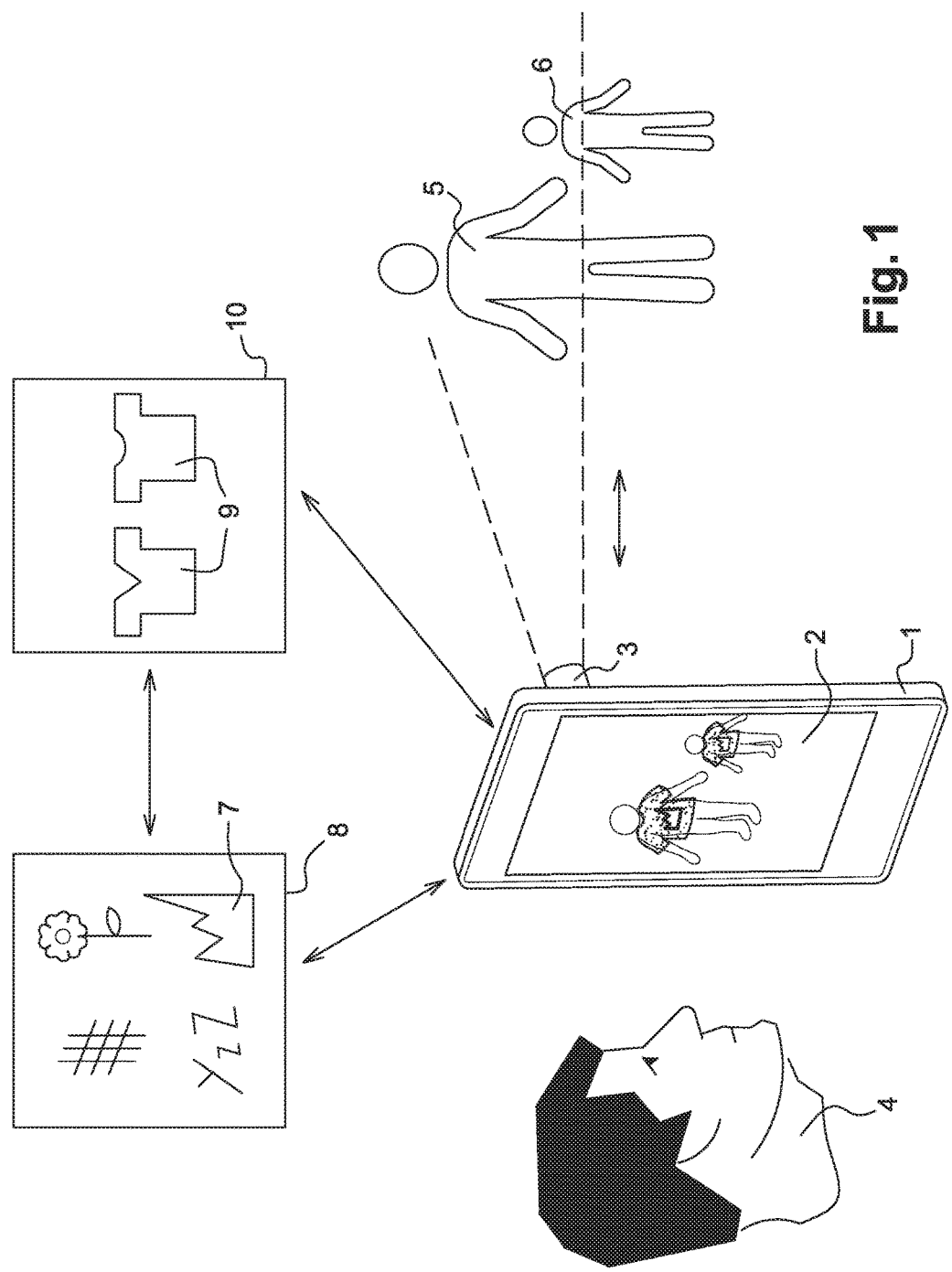
FIG. 1 is a schematic diagram showing the different steps of a method according to an embodiment of the invention.

FIG. 1 is a schematic representation of the implementation of several steps of the method according to an embodiment of the invention. The method is shown here with an electronic communication device 1 of the smartphone type. As a variation, a tablet, laptop or desktop computer, a multimedia touchscreen, a robot equipped with a screen or any other wireline or wireless electronic communication device can be used. Henceforth, for ease of reading, the expressions smartphone and electronic communication device will be used interchangeably.

The smartphone 1 is provided with at least one screen 2 and at least one video image acquisition organ 3. Here, the screen 2 is a touchscreen. As a variation, a non-touchscreen can be used. In another embodiment, the screen is of the flexible type. Typically, in the case of a smartphone 1, the image acquisition organ is a camera fitted in the smartphone 1. Such a camera is adapted to be able to take photos and to produce video sequences. In other words, the image acquisition organ 3 is adapted to acquire fixed or moving images. It will be seen that, in another embodiment, the organ 3 is adapted to acquire nighttime images, infrared images or even a thermal image. Hereinafter, for ease of reading, the term camera will be used to describe the fixed or moving image acquisition organ.

The camera 3 is located on the face of the smartphone 1 opposite that fitted with the screen 2. As a variation, it will be seen that this is an independent camera, connected by a wireline or wireless connection to the smartphone 1.

A user 4, represented schematically on the left in FIG. 1, is placed facing the screen 2, the camera 3 in this case being directed towards two persons 5 and 6, shown schematically.

From the image acquisition performed by the camera 3, characteristics are defined that allow the upper body of persons 5, 6 to be positioned on the screen 2 of the smartphone 1, whether the persons are still or in motion. Motion means a movement of the persons 5, 6 at normal walking pace, thus excluding any motion exceeding a speed of 6 km/h, so a person moving at rapid walking pace or running.

After capturing and encoding the details relating to the characteristics and position of the upper body of persons 5 and 6, the user selects a graphical motif 7 in a database 8. Here, the expression "graphical motif" means any motif, in color or in black and white, whether a painting, a drawing, a logo or a photo and whatever the subject shown, including letters and/or numbers. It will be seen that these different types of motifs can be combined together, for example, a drawing with letters forming a phrase or expression. In broad terms, therefore, this concerns a graphical or pictorial representation having an aesthetic and decorative function.

In FIG. 1, the database 8 is shown as an entity independent of the smartphone 1. In other words, this database can be hosted on a server remote from the smartphone 1, advantageously in cloud computing or on an external storage disc. The exchange of data between the database 8 and the electronic communication device 1 is performed in a wireless or non-wireless manner, for example by Wi-Fi, Bluetooth or other.

As a variation, the database is hosted in the electronic communication device 1, for example on an SD or micro SD memory card or even in the internal memory of the smartphone 1. This is the case, for example, when the graphical motif 7 is a photo taken with the camera 3 of the smartphone 1 and stored therein. Thus, the user 4 can himself populate the database 8 with graphical motifs 7. According to the invention, the user can add text, numbers or other to the motif selected from the database stored in the smartphone 1.

The selected graphical motif 7 is superimposed on the image of a garment 9 stored in a database 10. Here, the database 10 is also remote from the smartphone 1 in which case it is connected thereto by a wireline or wireless connection, in a manner similar to the connection between the base 8 and the smartphone 1.

In another embodiment, the databases 8 and 10 are combined and/or hosted on a remote server. After selecting the motif 7 of the garment 9, the method covered by the invention allows these two images to be superimposed on the image of the persons 5, 6 on the screen of the smartphone 1. This superimposition endures during the movement of one or both persons 5, 6, provided that the latter are in the field of view of the camera 3. Similarly, if a person exits the field of view of the camera 3, the method covered by the invention allows his image to be deleted from the screen 2, without affecting the images of the other persons. If a new person enters the field of view of the camera 3, or if a person who had left the field of view of the camera 3 comes back into the field of view, he is taken into account by the method and his image, with the chosen garment and motif appearing on the screen 2.

The different steps of the method are now described in greater detail, with reference to FIGS. 2 to 5.

Figure 2:
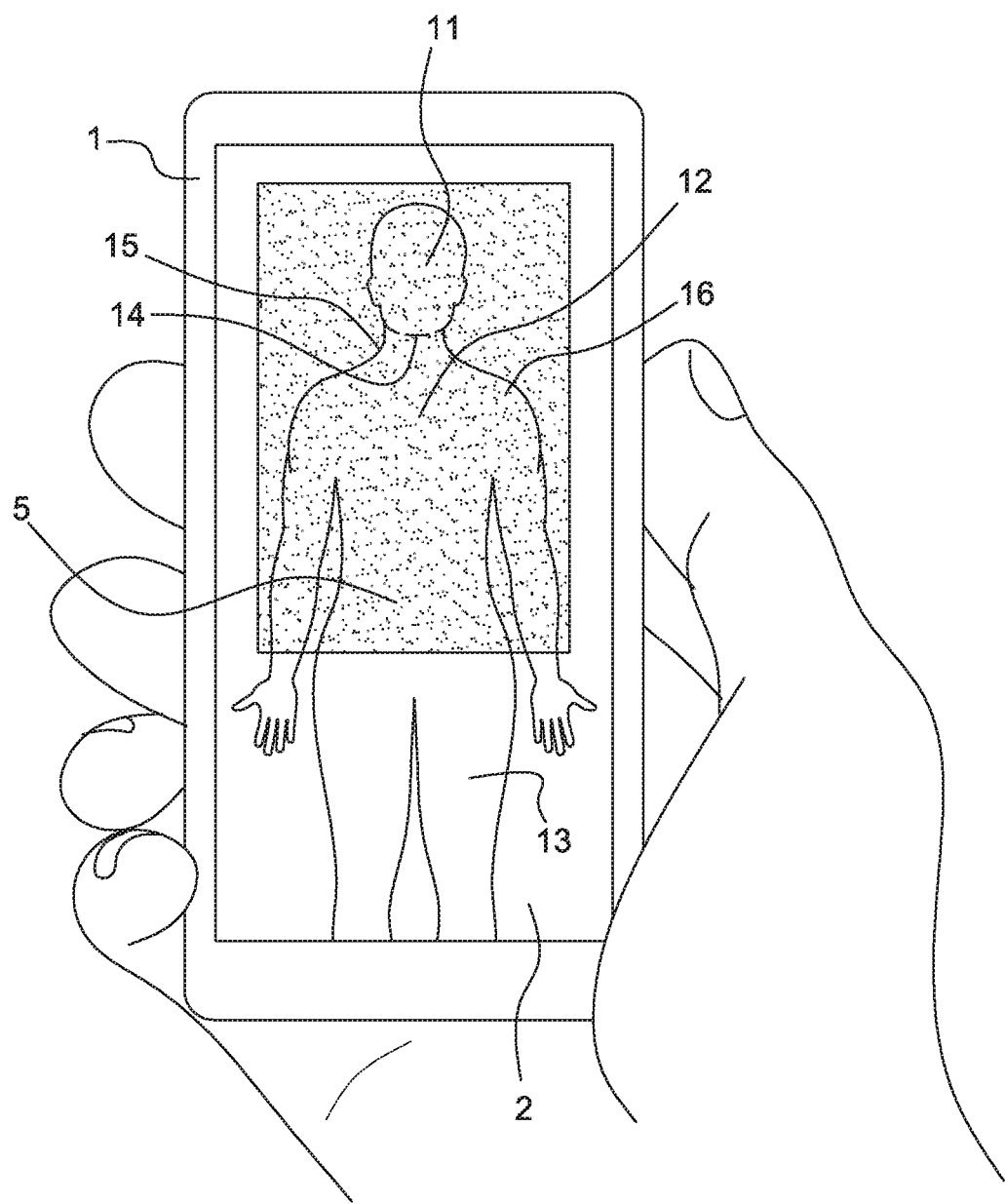
FIG. 2 is a perspective view, showing step a) of the method represented in FIG. 1.

FIG. 2 shows steps a) and b) of the method, with only one person 5 for ease of reading. Firstly, the person 5 must position himself in front of the lens of the video camera, in this case the photo camera 3. The position must comply with certain constraints. The upper body of the person 5, therefore at least the face 11 and the torso 12, down to the abdominal area, must be visible in the field of view of the camera 3. Clearly, it is possible that other parts of the body of the person 5, for example his legs 13, are also visible in the field of view of the camera 3. The person 5 must position himself facing the camera 3. During this step, the person must remain if not still, at least moving at a pace not exceeding a speed of around 6 km/h, namely at a so-called normal walking pace.

Once the person 5 is positioned, his face 11 is detected by a known computer means, for example by Google Cloud Vision API software developed by GOOGLE. If the software detects no face, the software continues to search until the face 11 of a person is detected. It will be remembered that this software ensures the automatic localization of human faces in a digital image, photo or video. The localization is associated with a given size and orientation of the face. Once the face 11 is detected, the application developed by the applicant searches for significant points in the face 11. Such as, for example, the right and left eye or the nose. This optional step is performed once the face 11 is detected as a whole. In fact, the search for points of interest is relatively long and is not therefore routinely performed by default. In any case, the information relating to the shape and size of the face 11 is recorded in the form of a numerical variable, called A1, by the application.

Figure 3:
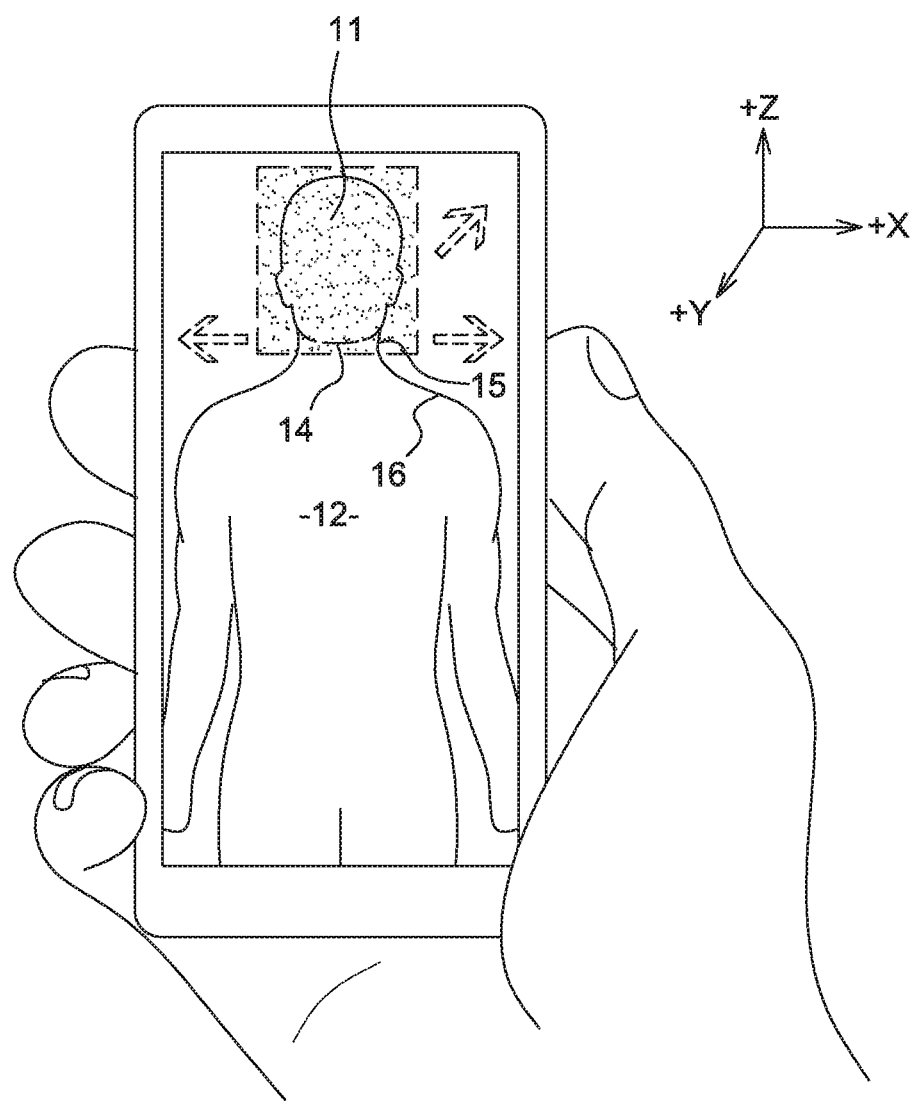
FIG. 3 is a view similar to FIG. 2 and showing steps b) and c)
Figure 4:
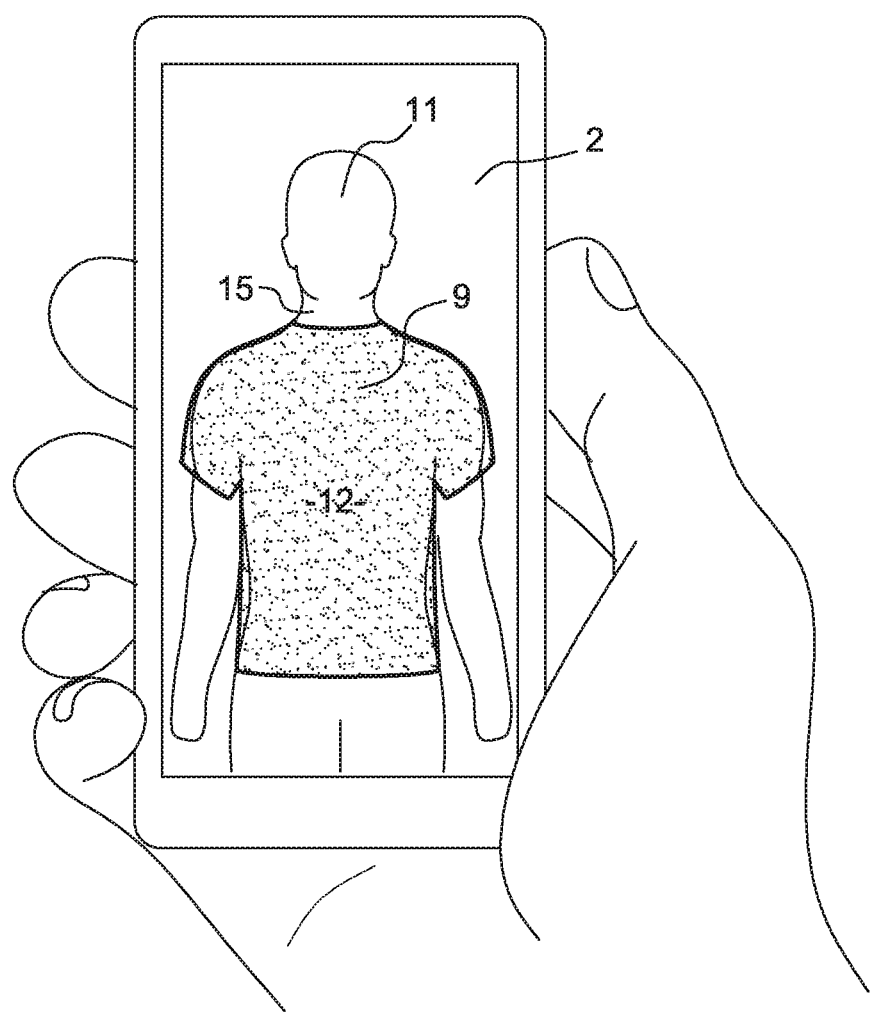
FIGS. 4 and 5 show the screen of a mobile electronic device on completion of steps d) and e) respectively with one and with several persons.

As shown in FIG. 3, the position of the face 11 on the screen 2 as well as its size in relation to the size of the screen 2, thus the ratio defining the dimensions of the face 11 in relation to the screen 2, are determined on the basis of the localization characteristics previously collected along the three axes XYZ and recorded by the application, known as AA1, while being associated with the variable A1 defining the shape and dimensions of the face 11.

The software used to detect the face 11 does not allow the rest of the torso 12 of the person to be detected. The detection area is limited, in the bottom part, by the chin 14. Now, in order to be able to virtually try on a garment it is necessary to detect the torso 12 of the person. For this, the applicant has developed within the scope of the present method, software that takes into account the length of the person's neck 15, the width of his shoulders 16 and the distance between the two shoulders, associated with the position of the person's shoulders 16 on the screen. For this, the method records the background image then any other element present in the image by considering it to be a part of the person's body. A measurement, on the stored image, is made of the space between the chin 14 of the face 11 and the shoulders 16, taking into account the length of the neck 15. Thus, it is possible to deduce the start of the location of the person's torso 12. Based on statistics provided by the applicant and stored in a dedicated database, the method associates the dimensions of a face and the neck of a person with the dimensions of his torso, provided that the person does not have a pronounced malformation of the face, neck or torso and that his morphology is within the normal standards used to define garment sizes.

This information, in the form of a numerical variable, is combined with variables A1 and AA1. Thus the shape, the dimensions and the position of the torso 12 of the person 5 are known. Once this step c) is completed, the garment is then superimposed in step d). For this, a certain number of garments 9 of known dimensions and shapes is stored in a database 10, advantageously but not exclusively hosted in the smartphone 1. Here, the garments 9 are T-shirts, in standard and known sizes indicated by the letters XS, S, M, L, XL and XXL. These T-shirts 9 are stored in at least one color for each size. Each T-shirt 9 is defined by a numerical variable AB1 taking into account its dimensions and its coordinates, along two axes, thus defining its position on the screen 2. Here, since the garment 9 is a flat object, it is enough to define its position along two axes, unlike the face 11, which is an object in volume requiring positioning along three axes.

By combining variables A1, AA1 and AB1, an optimal superimposition of the garment 9 on the torso 12 of the person 5 is ensured, in a known manner. At this stage, either an additional step f) has been performed or it is carried out now.

This step f) involves superimposing a graphical motif 7, as previously defined, onto the garment 9. The graphical motif 7 comes either from a database 8 integrated in the smartphone 1, or from a remote database, typically hosted by a server. In any case, the motif can be provided by the user himself or by a third party. It may, for example, be a photo, a logo of a company, association or sports club, a drawing or an artist's painting. It is easy to understand that the database 8 can be incremented prior to using the method, for example by an artist having provided a pictorial work. In this case, the user chooses the motif directly from the base 8. As a variation, he can himself introduce a personal graphical motif, for example a photo or a pictorial work that he has created.

Similarly, additional information on the third party who supplied the motif 7 can be associated with the motif. This may be, for example, the geolocation of the third party, an access to his website, to information of a biographical nature, to events diaries linked to the third party or any other information relating to the motif and/or the third-party creator of the motif.

In any case, the user can, thanks to the invention, not only virtually display a garment on his silhouette but also personalize the garment with a graphical motif.

It will be understood that, if the try-on proves satisfactory for the user, he can, in a known way, order the garment 9 with the chosen graphical motif 7. For this, a file comprising the graphical motif 7 and the variables AB1 defining the garment 9 is sent to a provider to apply the motif onto the garment. This may be, for example, a provider who performs flocking, screen-printing, laser etching or embroidery on a garment. Here, the term garment must be taken in the broad sense, whatever the textile material or type of garment (shirt, T-shirt, sweatshirt, pullover, etc.), including accessories such as caps or hats.

Figure 5:
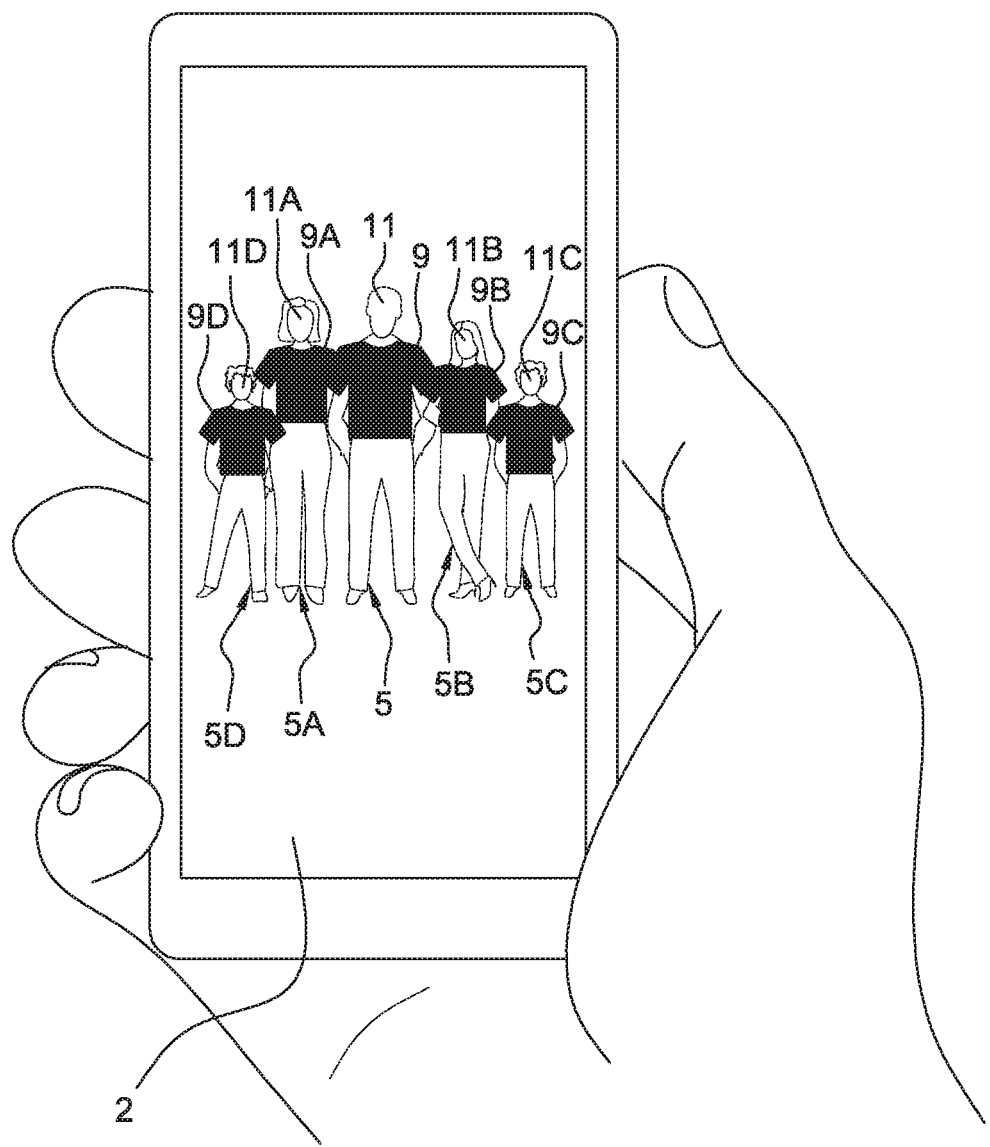

FIG. 5 shows the multi-detection of persons. For this, at step a) of detecting the face 11, the method covered by the invention enables a continual search for a face, even when a face 11 has been detected. This continual search enables the detection of all the new faces 11A to 11D entering the field of view of the camera 3. Once this other face 11A to 11D has been detected, the application assigns to it, as for the first face, a numerical variable of dimensioning and positioning along three axes. The same steps concerning the detection and characterization of the shoulders, and thus the torso, associated with this second face 11A to 11D are performed. By so doing, persons 5 to 5D visible on the screen 2 are continually modeled, regardless of whether their position and/or number varies. It is thus possible, for each of the detected persons 5 to 5D to superimpose a garment 9 to 9D. In fact, step a) is performed continually, without instructions to stop and the detected elements are stored. Any new face detected defines a collection of variables, adding to the base of variables already collected for the faces already detected.

According to a first embodiment, all detected persons 5 to 5D are, virtually, wearing the same garment 9 to 9D, with the same graphical motif 7. As a variation, each detected person 5 to 5D is provided with a personalized garment 9 to 9D that may be different, both in respect of color, shape and the graphical motif chosen, from the other persons 5 to 5D. For this, the associations of variables defining the person 5 to 5D, the garment 9 to 9D and the graphical motif 7 are individualized.

In any case, the method covered by the invention allows the continual superimposition, even when a person is in motion, of a garment 9 to 9D of a size adapted to the morphology of the detected person 5 to 5D. In other words, if a child or an adult appears in the field of view of the camera 3, there will automatically be a superimposition of a garment of the correct size for the person 5 to 5D, so as not to give a visual effect of a garment 9 to 9D that is too small or too large.

It will be understood that in other embodiments not shown, the support is an accessory such as, for example, a cap, a hat, a scarf or a bag.

The invention claimed is:

1. A method for a virtual try-on of garments based on augmented reality with aid of an electronic communication device equipped with at least one screen and one image acquisition organ, comprising:
   a) detecting with the image acquisition organ at least a face and shoulders of each of at least two persons in a field of view of the image acquisition organ, regardless of a position of each of the at least two persons in the field of view relative to each other, whether another face has been previously detected, or whether each of the at least two persons are still or in motion up to a speed of 6 km/hr, wherein the image acquisition organ continually detects for a new person entering the field of view by utilizing an application that assigns a numerical variable to each of the at least detected face and shoulders, and collecting and storing the numerical variable of each of the at least detected face and shoulders, while continuing to detect at least a face and shoulders of each new person entering the field of view,
   b) defining digital data representative of a shape and dimensions of the face and shoulders of each of the at least two persons detected at step a),
   c) defining digital data representative of a position of the face and shoulders of each of the at least two persons on a screen of the electronic communication device based on the digital data defined at step b),
   d) superimposing continuously while the at least two persons are in motion on the screen of the electronic communication device by data mapping an image of a garment from a database onto an image of each of the at least two persons by using the digital data defined in steps b) and c), wherein a size of each garment is adapted to conform to a morphology of each of the at least two persons,
   e) maintaining, on the screen of the electronic communication device, the superimposition of the image of the garment on the image of each of the at least two persons during a movement of each of the at least two persons in the field of view of the image acquisition organ of the electronic communication device, wherein steps a) to e) are repeated for as many times as there are persons detected after entering the field of view of the image acquisition organ of the electronic communication device and in that, before step d), at least one additional step f) is performed, involving superimposing an image of a graphical motif from the database onto the image of the garment.

2. The method of claim 1, wherein the electronic communication device is chosen from smartphones, tablets, laptop or desktop computers, multimedia touchscreens or robots equipped with a screen.

3. The method of claim 1, wherein the image acquisition organ is chosen from fixed image acquisition organs or from moving image acquisition organs.

4. The method of claim 1, wherein during step f), the graphical motif is chosen from drawings, paintings or photos stored in the database.

5. The method of claim 4, wherein during step f), the database is remote from the electronic communication device and cloud hosted.

6. The method of claim 4, wherein during step f), the database is hosted by the electronic communication device.

7. The method of claim 4, wherein during step f), the graphical motif stored in the database is provided by a user of the method.

8. The method of claim 4, wherein during step f), the graphical motif stored in the database is provided by a third party having only limited access to the database.

9. The method of claim 4, wherein during step f), additional information on a third party providing the graphical motif is associated with the graphical motif.

10. The method of claim 9, wherein the additional information is a geolocation of the third party or an internet link to a dedicated site.

11. The method of claim 1, wherein the image acquisition organ further detects one or more significant points in each face after detecting each face as a whole.

12. The method of claim 11, wherein the one or more significant points in each face are a left eye and a right eye.

13. The method of claim 11, wherein the one or more significant points in each face is a nose.

14. The method of claim 1, wherein the numerical variable of each of the at least detected face and shoulders includes dimensions and positions along three axes.

15. The method of claim 1, wherein all detected persons are virtually wearing a same garment with a same graphical motif.

16. The method of claim 1, wherein each detected person is virtually wearing a different personalized garment.

17. A garment virtual try-on device using the method according to claim 1.

* * * * *